United States Patent
Kuroda et al.

(10) Patent No.: US 8,827,288 B2
(45) Date of Patent: Sep. 9, 2014

(54) STABILIZER AND METHOD FOR MANUFACTURING THE STABILIZER

(75) Inventors: Shigeru Kuroda, Yokohama (JP); Shuji Ohmura, Yokohama (JP)

(73) Assignee: NHK Spring Co., Ltd., Yokohama-shi, Kanagawa (JP)

(*) Notice: Subject to any disclaimer, the term of this patent is extended or adjusted under 35 U.S.C. 154(b) by 7 days.

(21) Appl. No.: 13/585,211

(22) Filed: Aug. 14, 2012

(65) Prior Publication Data

US 2012/0306136 A1 Dec. 6, 2012

Related U.S. Application Data

(63) Continuation of application No. PCT/JP2011/053254, filed on Feb. 16, 2011.

(30) Foreign Application Priority Data

Feb. 16, 2010 (JP) ................................. 2010-031743

(51) Int. Cl.
*B60G 21/055* (2006.01)

(52) U.S. Cl.
USPC .................................................. 280/124.107

(58) Field of Classification Search
USPC ..................... 280/124.107, 124.106, 124.152; 267/273; 72/364
See application file for complete search history.

(56) References Cited

U.S. PATENT DOCUMENTS

| | | | | |
|---|---|---|---|---|
| 4,365,824 A | * | 12/1982 | Ohno et al. | 267/273 |
| 4,378,122 A | * | 3/1983 | Ohno et al. | 267/273 |
| 4,429,899 A | * | 2/1984 | Ohno et al. | 267/273 |
| 4,469,349 A | | 9/1984 | Tomita et al. | |
| 4,533,402 A | | 8/1985 | Ohno et al. | |
| 7,896,983 B2 | | 3/2011 | Koyama et al. | |
| 7,984,918 B2 | * | 7/2011 | Jung | 280/124.106 |
| 8,539,675 B2 | * | 9/2013 | Jung | 29/897.2 |
| 2002/0170177 A1 | | 11/2002 | Koyama et al. | |

FOREIGN PATENT DOCUMENTS

| | | |
|---|---|---|
| CN | 1381362 A | 11/2002 |
| JP | 56-39910 A | 4/1981 |
| JP | 56-40007 A | 4/1981 |
| JP | 56-040008 U | 4/1981 |
| JP | 56-170005 U | 12/1981 |
| JP | 58-45130 Y2 | 10/1983 |
| JP | 62-21642 B2 | 5/1987 |
| JP | 62-224422 A | 10/1987 |
| JP | 3350446 B2 | 9/2002 |

OTHER PUBLICATIONS

Japanese Office Action dated Sep. 11, 2012 (and English translation thereof) in counterpart Japanese Application No. 2010-031743.

(Continued)

*Primary Examiner* — Faye M. Fleming
(74) *Attorney, Agent, or Firm* — Holtz Holtz Goodman & Chick PC

(57) ABSTRACT

A torsion portion extending in a vehicle width direction and having a first cross-sectional area, shoulder portions located at both ends of the torsion portion and having a second cross-sectional area larger than the first cross-sectional area and arm portions extending from the shoulder portions in a front and back direction of a vehicle, respectively and having the first cross-sectional area, so that even when a hollow member is used for weight saving, can be realized by design and manufacturing method facilitating making uniform principal stress as in a solid member.

2 Claims, 4 Drawing Sheets

(56) References Cited

OTHER PUBLICATIONS

Japanese Office Action dated Jun. 18, 2013 (and English translation thereof) in counterpart Japanese Application No. 2010-031743.

International Preliminary Report on Patentability (IPRP) dated Sep. 27, 2012 (in English) issued in parent International Application No. PCT/JP2011/053254.

Chinese Office Action dated Mar. 31, 2014 issued in counterpart Chinese Application No. 201180009605.1.

* cited by examiner

STABILIZER AND METHOD FOR MANUFACTURING THE STABILIZER

CROSS REFERENCE TO RELATED APPLICATIONS

This application is a Continuation Application of PCT Application No. PCT/JP2011/053254, filed Feb. 16, 2011 and based upon and claiming the benefit of priority from prior Japanese Patent Application No. 2010-031743, filed Feb. 16, 2010, the entire contents of all of which are incorporated herein by reference.

BACKGROUND OF THE INVENTION

1. Field of the Invention

The present invention relates to a stabilizer for vehicles including a hollow member and a method for manufacturing the stabilizer, and relates particularly to a technique capable of contributing to the weight saving of the stabilizer and facilitating the design and manufacture of the stabilizer.

2. Description of the Related Art

A stabilizer for vehicles has a function of connecting a stabilizer bar to a suspension device of a vehicle and stabilizing the attitude of the vehicle using a torsional reaction force of the stabilizer bar. For example, the stabilizer for vehicles is configured so that the both ends of the stabilizer bar formed into a U-shape are connected to an operating portion of the suspension device to fix a torsion portion of the stabilizer bar to a vehicle body frame by a fixing member, and, thus, to receive the torsional reaction force. The stabilizer bar is formed by bending a hollow pipe (hollow member) to contribute to weight saving.

Meanwhile, there has been known a technique of using a solid member and changing a cross section according to a portion (for example, see Jpn. UM Appln. KOKOKU Publication No. 58-45130, Jpn. Pat. Appln. KOKOKU Publication No. 62-21642, and Japanese Patent No. 3350446). There has been known a technique of making uniform principal stress and shear stress produces according to an applied external force.

BRIEF SUMMARY OF THE INVENTION

The stabilizer whose cross section is changed according to a portion has the following problems. Specifically, it is difficult in manufacturing to change the cross-sectional area of the stabilizer bar, and manufacturing cost may be increased. Moreover, heat treatment requires complicated processes. Especially when a hollow member is used for weight saving, there is a problem that it is difficult in design to manufacture the stabilizer bar while changing the cross-sectional area.

Thus, this invention provides a stabilizer, which even when a hollow member is used for weight saving, can be realized by design and manufacturing method facilitating making uniform principal stress as in a solid member, and a method for manufacturing the stabilizer.

In order to satisfy the above object, a stabilizer for vehicles including a hollow member according to the present invention is provided with a torsion portion extending in a vehicle width direction and having a first cross-sectional area, shoulder portions located at both ends of the torsion portion and having a second cross-sectional area larger than the first cross-sectional area, and arm portions extending from the shoulder portion in a front and back direction of a vehicle, respectively and having the first cross-sectional area.

In order to satisfy the above object, in a method for manufacturing a stabilizer for vehicles according to the present invention, the stabilizer includes a hollow member and has a torsion portion extending in a vehicle width direction and having a first cross-sectional area, shoulder portions located at both ends of the torsion portion and having second cross-sectional area larger than the first cross-sectional area, and arm portions extending from the shoulder portion in a front and back direction of a vehicle, respectively and having the first cross-sectional area. The method includes bending in the shoulder portion, preheating in a region including at least the shoulder portion, and fully heating the torsion portion, the shoulder portion, and the arm portion.

DETAILED DESCRIPTION OF THE INVENTION

Figure 1:
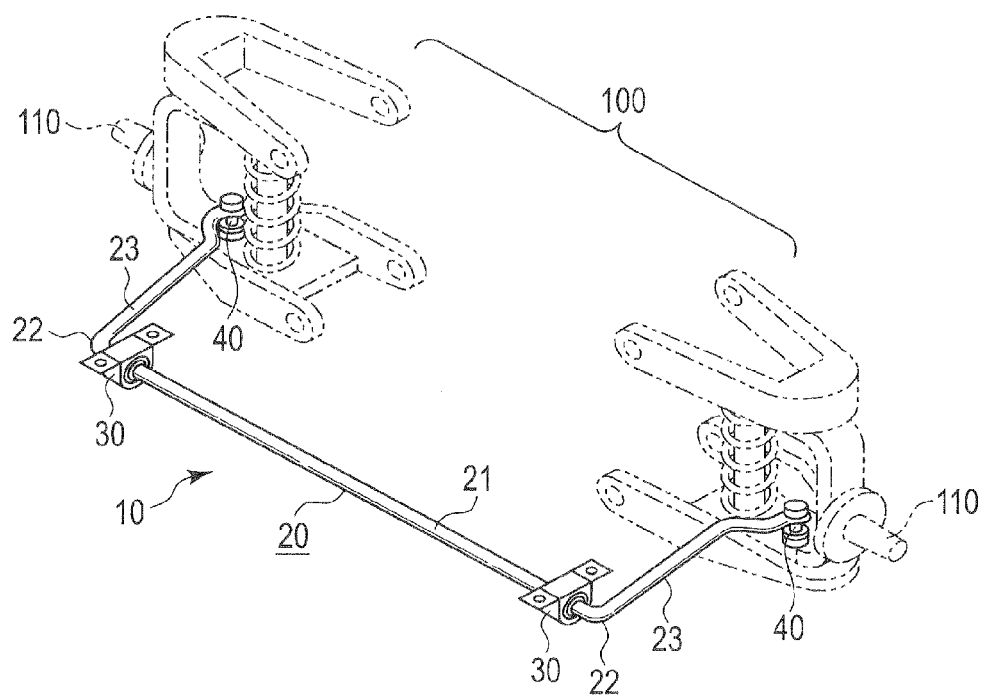
FIG. 1 is a perspective view showing a stabilizer for vehicles and a suspension device of a vehicle front wheel according to an embodiment of the present invention.
Figure 2:
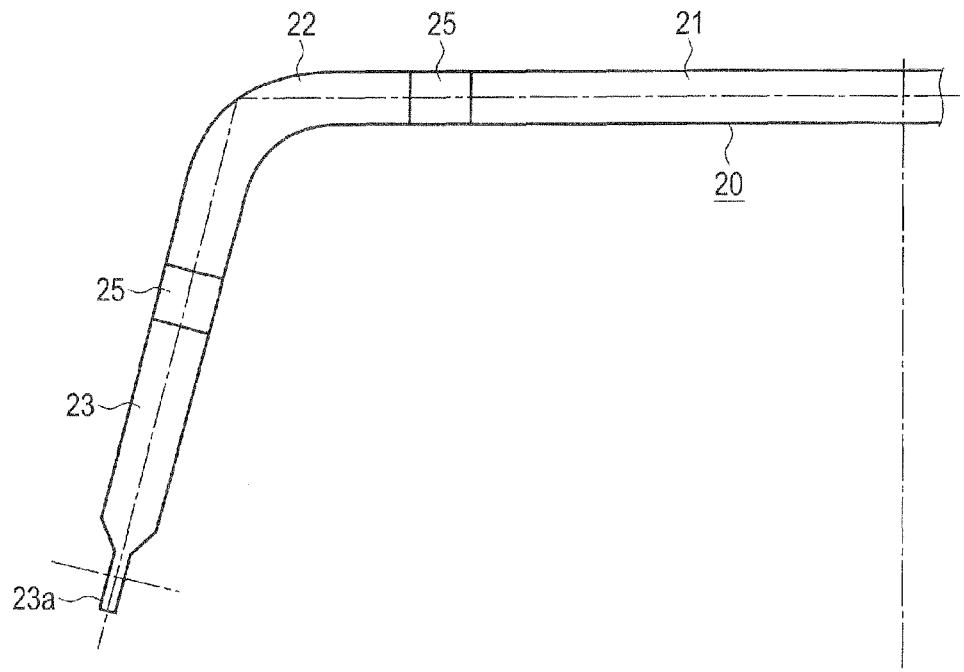
FIG. 2 is a plan view showing a relevant portion of a stabilizer bar incorporated into the stabilizer for vehicles.
Figure 3:
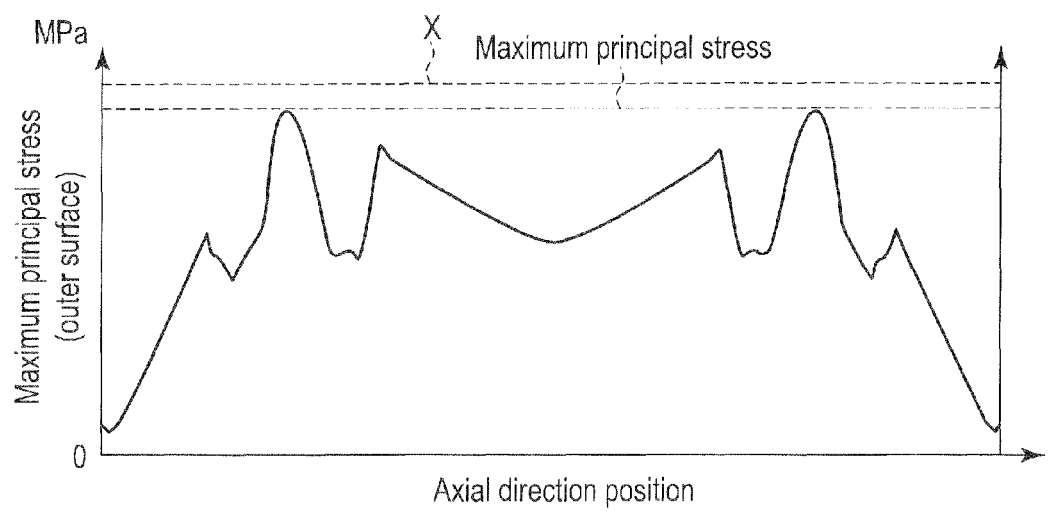
FIG. 3 is a stress distribution chart showing a peak value of principal stress applied to the stabilizer bar.
Figure 4:
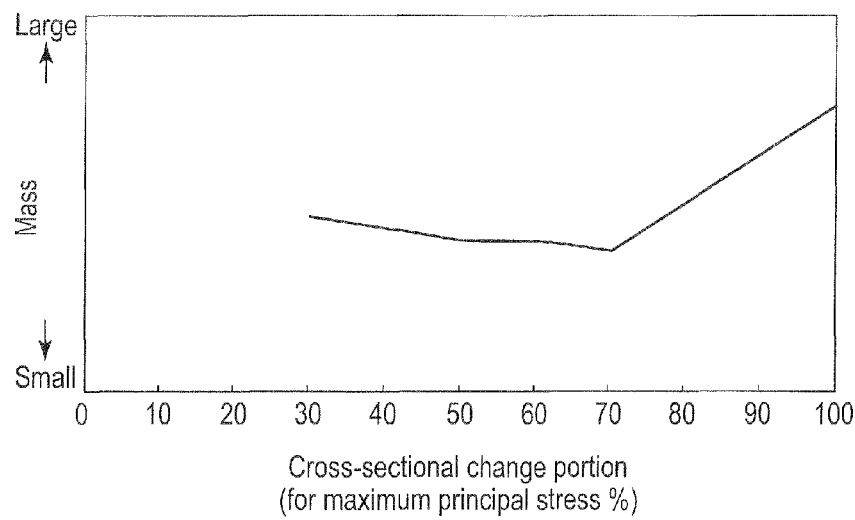
FIG. 4 is an explanatory view showing a relationship between a position of a cross-sectional change portion of the stabilizer bar and the mass of the stabilizer bar.

FIG. 1 is a perspective view showing a stabilizer 10 for vehicles and a suspension device 100 of a vehicle front wheel according to an embodiment of the present invention. FIG. 2 is a plan view showing a relevant portion of a stabilizer bar 20 incorporated into the stabilizer 10 for vehicles. FIG. 3 is a stress distribution chart showing a peak value of principal stress applied to the stabilizer bar 20. FIG. 4 is an explanatory view showing a relationship between a position of a cross-sectional change portion 25 of the stabilizer bar 20 and the mass of the stabilizer bar 20.

The stabilizer 10 for vehicles is provided with the stabilizer bar 20 constituted of a hollow member, a fixing member 30 fixing the stabilizer bar 20 to a frame portion (riot shown) of a vehicle body, and a stabilizer link 40 connecting a front end 23a of the stabilizer bar 20 to an operating portion of the suspension device 100. The outer diameter of the stabilizer bar 20 is set to approximately 10 to 100 mm according to an input load.

As shown in FIG. 2, the stabilizer bar 20 is provided with a torsion portion 21 crossed in a width direction of the vehicle body and having a first cross-sectional area S1, shoulder portions 22 located at the both ends of the torsion portion 21 and having a second cross-sectional portion S2 larger than the first cross-sectional area S1, and arm portions 23 extending from the shoulder portion 22 in a front and back direction of a vehicle, respectively and having the first cross-sectional area S1 and is formed into a substantially U-shape. Further, cross-sectional change portions 25 whose cross-sectional area progressively increases from the first cross-sectional area S1 to the second cross-sectional area S2 are provided between the torsion portion 21 and the shoulder portion 22 and between the arm portion 23 and the shoulder portion 22.

Since the cross-sectional change portions 25 are provided at positions holding a pair of the shoulder portions 22, the cross-sectional change portions 25 are provided at four positions in total.

The cross-sectional change portion 25 is disposed at a position where a maximum principal stress that is 65 to 70% of the maximum value of the maximum principal stress produced in the shoulder portion 22 is produced. A position determination method for determining the position of the cross-sectional change portion 25 will be described later.

The torsion portion 21 and the arm portion 23 having the first cross-sectional area S1 and the shoulder portion 22 having the second cross-sectional area S2 are formed so that the inner diameters are the same as each other, and the cross-sectional areas are different because they have different outer diameters.

The stabilizer bar 20 has a function of stably holding the suspension device 100 with a torsional reaction force, which is obtained from torsion produced in the torsion portion 21 when the operating portion of the suspension device 100 vertically moves and the arm portion 23 is operated following the vertical movement of the suspension device 100. At this time, a load is applied to each portion of the stabilizer bar 20. FIG. 3 is a stress distribution chart showing a peak value of the principal stress produced in each portion.

The suspension device 100 is a double-wishbone-type suspension device, for example, and a front wheel and so on (not shown) are attached to axle portions 110 provided on the left and right sides.

Figure 5:
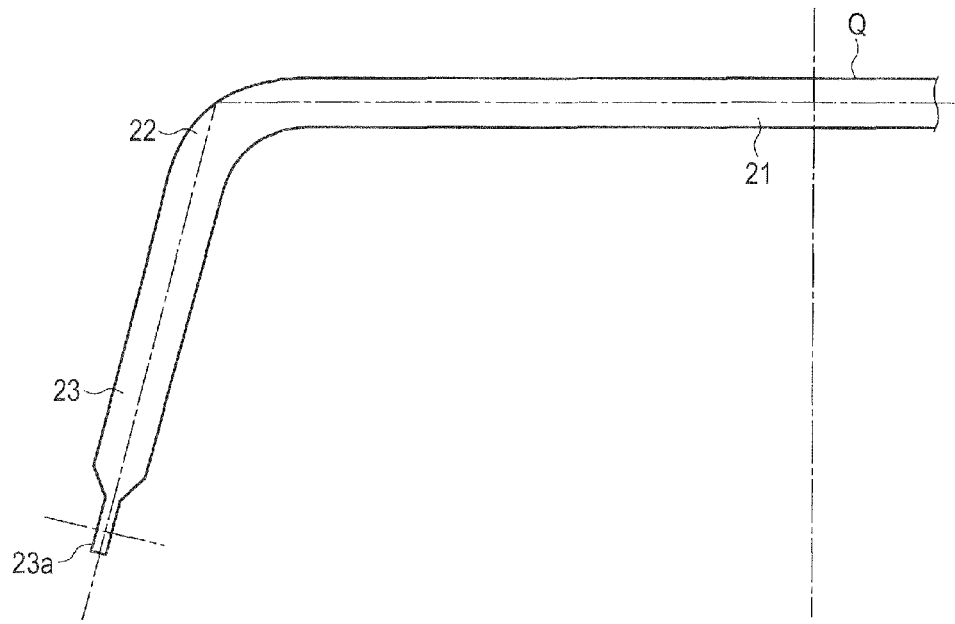
FIG. 5 is a plan view showing a hollow member before a material diameter change in the stabilizer bar.
Figure 6:
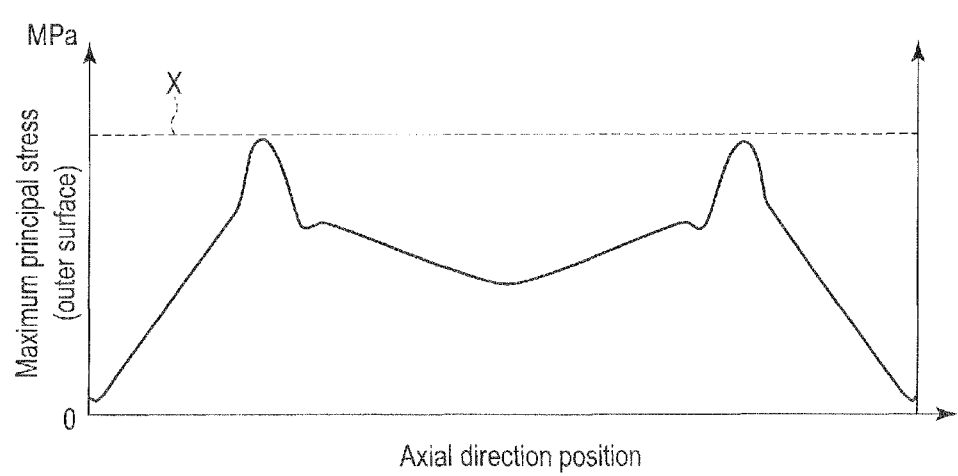
FIG. 6 is an explanatory view showing a relationship between a material diameter change portion and a weight reduction ratio in the stabilizer bar.

The stabilizer bar 20 having the above constitution is designed as follows. Namely, as shown in FIG. 5, a stabilizer bar Q with a fixed cross-sectional area is used as a standard base material, and the maximum principal stress applied to each portion is calculated (see, FIG. 6). As seen in FIG. 6, the shoulder portion 22 has a maximum value X of the maximum principal stress, and the front end 23a of the arm portion 23 has a minimum value of the maximum principal stress. Thus, the stabilizer bar 20 is designed so that a difference of the maximum principal stress between the shoulder portion 22 and the front end 23a of the arm portion 23 is small, whereby the optimization of the cross-sectional area of the stabilizer bar is considered. In this case, calculation is performed to satisfy endurance requirements against the maximum principal stress also in a small diameter portion having the first cross-sectional area S1.

In order to facilitate a manufacturing process, the stabilizer bar has two types of cross-sectional areas including a large diameter cross-sectional area and a small diameter cross-sectional area, for example. The cross-sectional change portion 25 is disposed at a portion where the cross-sectional area changes.

Here, the outer diameter of the shoulder portion 22 having the maximum value of the maximum principal stress is a large diameter, and the outer diameters of the torsion portion 21 and the arm portion 23 are small diameters. FIG. 4 shows the positions of the cross-sectional change portion 25 changed based on the maximum value (100%) of the maximum principal stress. Specifically, the cross-sectional change portion 25 is disposed at respective positions where the maximum principal stress is 70, 60, 50, 40, and 30% of the maximum value of the maximum principal stress, and the maximum principal stress in each portion is measured. Further, the mass of the stabilizer bar 20 in each case is measured.

As seen in FIG. 4, when the cross-sectional change portion 25 is disposed at the position where the maximum principal stress is 70% of the maximum value of the maximum principal stress, the mass of the stabilizer bar 20 is a minimum value. Thus, it is preferable to dispose the cross-sectional change portion 25 at a position where the maximum principal stress is 70% of the maximum value.

Meanwhile, the cross-sectional change portion 25 is required to be disposed in a straight portion because of limitation of bending process of the stabilizer bar 20. The stabilizer bar 20 has various curved shapes in consideration of the balance with peripheral components (for example, the fixing member 30), and according to the curved shape, the straight portion is not always set to the position where the maximum principal stress is 70% of the maximum value. Accordingly, the cross-sectional change portion 25 may be set to the closest position to the position where the maximum principal stress is substantially 70% of the maximum value. Thus, the cross-sectional change portion 25 is disposed at a position where the maximum principal stress that is 65 to 70% of the maximum value of the maximum principal stress produced in the shoulder portion 22 is produced.

The stabilizer bar 20 is manufactured by the following process. Namely, a hollow pipe formed linearly is provided. Next, the outer diameter is cut by machining to form a portion (corresponding to the torsion portion 21 and the arm portion 23) having the first cross-sectional area S1, a portion (to become the shoulder portion 22) having the second cross-sectional area S2, and a portion (to become the cross-sectional change portion 25) whose cross section changes. At this time, the inner diameters are the same, and only the outer diameters are different.

Instead of the machining, the cuter diameter may be changed by swaging using a cored bar. In this case, an inner diameter difference is approximately 0.5 to 1 mm. The inner diameter may be changed while keeping the outer diameter constant by drawing process.

Then, a hollow pipe is subjected to bending to form the torsion portion 21, the shoulder portion 22 and the arm portion 23 (bending process).

Then, the hollow pipe is subjected to hardening process. At this time, since a pair of the cross-sectional change portions 25 holding the shoulder portion 22 is formed, an electrode is connected to this position to be energized, and, thus, to preheat the large-diameter shoulder portion 22 (preheating process). Subsequently, an electrode is connected to a pair of the front ends 23a of the arm portions 23 to be energized, and, thus, to fully heat the entire stabilizer bar 20 (full heating process).

According to the above constitution, the stabilizer bar 20 can be heated uniformly, and desired heat treatment (hardening/tempering and so on) can be performed.

The stabilizer 10 for vehicles having the above constitution operates as follows. Namely, for example if wheels on one side of a vehicle and one of the suspension devices 100 descend during running of the vehicle, a nip angle is formed between the left and right arm portions 23, or the nip angle is increased. Therefore, the torsion portion 21 is twisted, and the torsional reaction force is produced. The torsion portion 21 is returned to its original state by the torsional reaction force, and the suspension device 100 is returned to its original position. According to this constitution, steering stability of a vehicle is maintained.

When a maximum stroke according to the vertical movement of the suspension device 100 is applied, the principal stress is produced in the stabilizer bar 20 by a load. At this time, when the cross-sectional change portion 25 is located at the position shown in FIG. 2, as shown in FIG. 3, the maximum value of the maximum principal stress does not exceed the maximum value X of the maximum principal stress before designing compared with the case of using a hollow pipe with a fixed cross-sectional area. Thus, the cross-sectional area of the shoulder portion in which the maximum value of the maximum principal stress is produced can be reduced, and the entire weight of the stabilizer bar 20 can be saved. Meanwhile, by virtue of the limitation of the cross-sectional area to two types, design and manufacture can be simplified.

As described above, in the stabilizer bar 20 incorporated into the stabilizer 10 for vehicles according to the present embodiment, even when a hollow member is used for weight saving, the stabilizer can be realized by design and manufacturing method facilitating making uniform the principal stress as in the solid member.

The present invention is not limited to the above embodiment, and it is obvious that the present invention can be variously modified and practiced without departing from the scope of the present invention.

This invention can provide a stabilizer, which even when a hollow member is used for weight saving, can be realized by design and manufacturing method facilitating making uniform principal stress, and a method for manufacturing the stabilizer.

What is claimed is:

1. A stabilizer for vehicles comprising a hollow member, comprising:
   a torsion portion extending in a vehicle width direction and having a first cross-sectional area;
   shoulder portions located at both ends of the torsion portion, the shoulder portions having a different outer diameter than an outer diameter of the torsion portion and having a second cross-sectional area larger than the first cross-sectional area;
   arm portions respectively extending from the shoulder portions in a front and back direction of a vehicle, the arm portions having the first cross-sectional area; and
   cross-sectional change portions respectively provided between the torsion portion and the shoulder portions and between the arm portions and the shoulder portions;
   wherein each cross-sectional change portion is located at a position where a maximum principal stress is produced that is 65 to 70% of a maximum principal stress produced in the shoulder portion;
   wherein each cross-sectional change portion has a circular cross-sectional profile; and
   wherein a cross-sectional area of each cross-sectional change portion increases from the first cross-sectional area to the second cross-sectional area.

2. A method for manufacturing a stabilizer for vehicles, the stabilizer comprising a hollow member and having (i) a torsion portion extending in a vehicle width direction and having a first cross-sectional area, (ii) bending portions located at both ends of the torsion portion and having a second cross-sectional area larger than the first cross-sectional area, (iii) arm portions respectively extending from the bending portion in a front and back direction of a vehicle and having the first cross-sectional area, and (iv) cross-sectional change portions respectively provided between the torsion portion and the bending portions and between the arm portions and the bending portions, wherein the cross-sectional change portion is located at a position where a maximum principal stress is produced that is 65 to 70% of a maximum principal stress produced in the bending portion, wherein each cross-sectional change portion has circular cross-sectional profile, wherein a cross-sectional area of each cross-sectional change portion increases from the first cross-sectional area to the second cross-sectional area, and wherein the method comprises:
   changing an outer diameter of the hollow member by cutting the hollow member by machining or by swaging using a cored bar;
   bending in the bending portion;
   preheating, by energizing, in a region including at least the bending portion; and
   fully heating the torsion portion, the bending portion, and the arm portion.

* * * * *